United States Patent [19]

Hiramatsu et al.

[11] Patent Number: 4,727,966
[45] Date of Patent: * Mar. 1, 1988

[54] DIFFERENTIAL WITH DIFFERENTIAL MOTION LIMITING MECHANISM

[75] Inventors: Takeo Hiramatsu, Nagaokakyo; Bonnosuke Takamiya, Joyo; Yoshimasa Nagayoshi, Kyoto, all of Japan

[73] Assignee: Mitsubishi Jidosha Kogyo Kabushiki Kaisha, Tokyo, Japan

[*] Notice: The portion of the term of this patent subsequent to Jan. 19, 2005 has been disclaimed.

[21] Appl. No.: 738,571

[22] Filed: May 28, 1985

[30] Foreign Application Priority Data

May 30, 1984 [JP] Japan ................................. 59-109872
May 21, 1985 [JP] Japan ................................. 60-109065

[51] Int. Cl.⁴ .................... B60K 17/35; F16D 25/02; F16D 25/063; F16D 43/284
[52] U.S. Cl. ................................. 192/0.033; 74/711; 180/249; 192/85 AA; 192/103 F
[58] Field of Search ........... 192/0.033, 103 F, 85 AA; 74/710.5, 711; 180/248, 249

[56] References Cited

U.S. PATENT DOCUMENTS

| | | | |
|---|---|---|---|
| 2,153,372 | 4/1939 | Hyde | 192/85 AA |
| 2,670,828 | 3/1954 | McFarland | 192/85 AA |
| 3,040,600 | 6/1962 | Mueller | 74/711 |
| 3,724,289 | 4/1973 | Kennicutt | 74/711 |
| 3,748,928 | 7/1973 | Shiber | 74/711 |
| 3,752,280 | 8/1973 | Cheek | 192/103 F X |
| 3,894,446 | 7/1975 | Snoy et al. | 192/103 F X |
| 3,974,900 | 8/1976 | Park | 192/103 F X |
| 4,012,968 | 3/1977 | Kelbel | 192/85 AA X |
| 4,305,313 | 12/1981 | Konkle | 74/711 |
| 4,445,400 | 5/1984 | Sullivan et al. | 192/85 AA X |
| 4,541,503 | 9/1985 | Akutagawa et al. | 180/249 |

FOREIGN PATENT DOCUMENTS

| | | | |
|---|---|---|---|
| 3145117 | 5/1983 | Fed. Rep. of Germany | 180/249 |
| 1093488 | 5/1955 | France | 192/85 AA |
| 1411283 | 10/1975 | United Kingdom | . |
| 2038429 | 7/1980 | United Kingdom | 74/711 |

Primary Examiner—Rodney H. Bonck
Attorney, Agent, or Firm—Bruce L. Adams; Van C. Wilks

[57] ABSTRACT

A differential capable of distributing a torque of the input shaft to the two output shaft thereof and equipped with a differential motion limiting mechanism. The differential comprises a differential mechanism which receives a driving force through the input shaft thereof from a transmission connected to an engine and distributes the driving force to two output shafts; an oil pump interposed between two shafts, namely, the input shaft and either one of the output shafts themselves, and adapted to be driven by a differential revolving speed between the two shafts so as to produce a discharge pressure corresponding to the differential revolving speed; a clutch mechanism for coupling the two shafts; a hydraulic circuit for supplying the discharge pressure of the oil pump to the clutch mechanism to engage the two shafts; and hydraulic control means provided in the hydraulic circuit to control the discharge pressure to be supplied to the clutch mechanism. The differential produces a limiting torque corresponding to the differential revolving speed between the two shafts to limit the differential motion between the two shafts.

27 Claims, 9 Drawing Figures

DIFFERENTIAL WITH DIFFERENTIAL MOTION LIMITING MECHANISM

BACKGROUND OF THE INVENTION

1. Field of the Invention

The present invention relates to a differential capable of dividing the torque of the input shaft and transmitting the dividing torques to two output shafts, and provided with a differential motion limiting mechanism.

2. Description of the Prior Art

A so-called limited slip differential (abbreviated to "LSD" hereinafter) has been proposed. Without any relationship to the quantity of the differential revolving speed of two output shaft, this LSD is designed to transmit a torque: $(Td/2)-\alpha$ to the faster output shaft and a torque: $(Td/2)+\alpha$ to the slower output shaft, where Td is the torque of the differential casing transmitted from the engine and $\alpha$ is a fixed value specific to the construction of the LSD.

There has also been proposed a Ferguson differential motion limiting mechanism having a multiple disk mechanism which rotates together with the output shafts and is immersed in silicon oil or the like, and adapted to provide a limited torque proportional to the differential revolving speed between the output shafts, namely, a torque corresponding to $\alpha$, by utilizing a phenomenon that the shearing force of silicon oil varies according to the differential revolving speed between the output shafts.

In this LSD, however, even a slight differential revolving speed between the output shafts effects the differential motion limiting function of the mechanism, which affects adversely driving feeling and the controllability of the motor vehicle.

The Ferguson differential motion limiting mechanism also has a problem that a multiple disk mechanism is indispensable, and hence the mechanism is enlarged.

SUMMARY OF THE INVENTION

Accordingly, the present invention has been made to solve those intrinsic problems of those conventional differential motion limiting mechanisms, and it is an object of the present invention to provide a differential with a differential motion limiting mechanism having a simple construction and capable of providing a limited torque according to differential revolving speed between the output shafts.

A differential with a differential motion limiting mechanism according to the present invention comprises a differential mechanism which receives a driving force through the input shaft thereof from a transmission connected to an engine and distributes the driving force to two output shaft; an oil pump interposed between two of three input and output shafts, namely, between input shaft and one of the output shafts of between the output shafts, and adapted to be driven by a differential revolving speed between the two shafts so as to produce a discharge pressure corresponding to the differential revolving speed; a clutch mechanism for coupling the two shafts; a hydraulic circuit for supplying the discharge pressure of the oil pump to the clutch mechanism to enable the same to couple the two shafts; and hydraulic control means provided in the hydraulic circuit to control the discharge pressure to be supplied to the clutch mechanism.

The discharge pressure of an oil pump which is interposed between the two shafts, namely, between the input shaft of a differential mechanism and one of two output shafts or between the output shafts, and which is adapted to be driven by a differential revolving speed between those two shafts is supplied through a hdyraulic circuit to a clutch mechanism for engaging the two shafts associated with the oil pump, and the discharge pressure of the oil pump is optimized by hydraulic control means. Accordingly, the operation of the clutch mechanism is optimized so that the differential motion of the differential mechanism is controlleld appropriately according to the running condition of the motor vehicle.

DETAILED DESCRIPTION OF THE PREFERRED EMBODIMENTS

Preferred embodiments of the present invention will be described hereinafter in conjunction with the accompanying drawings.

Figure 1:
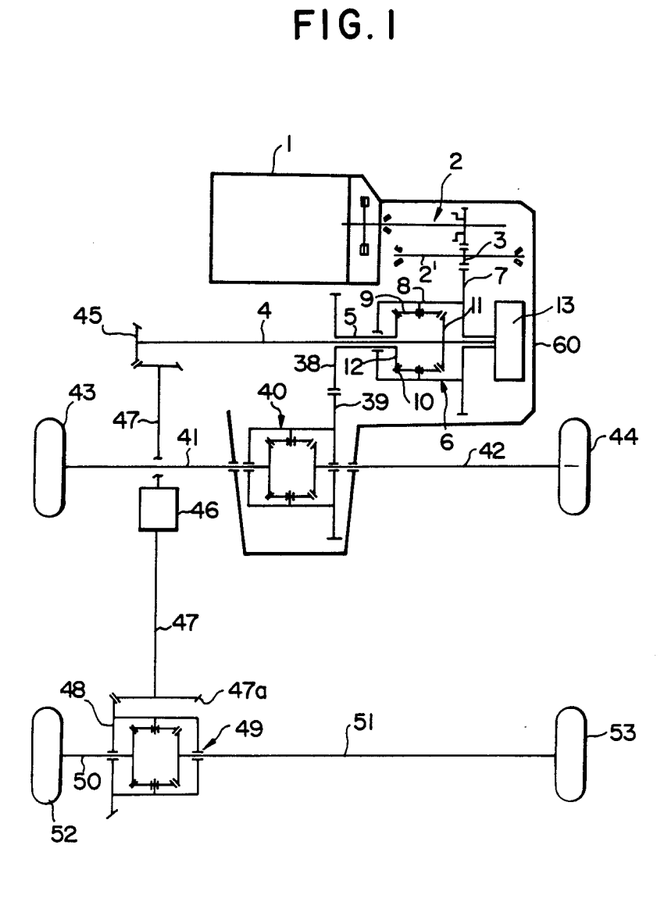
FIG. 1 is a schematic illustration showing the constitution of a power transmission system employed in a first embodiment of the present invention.
Figure 2:
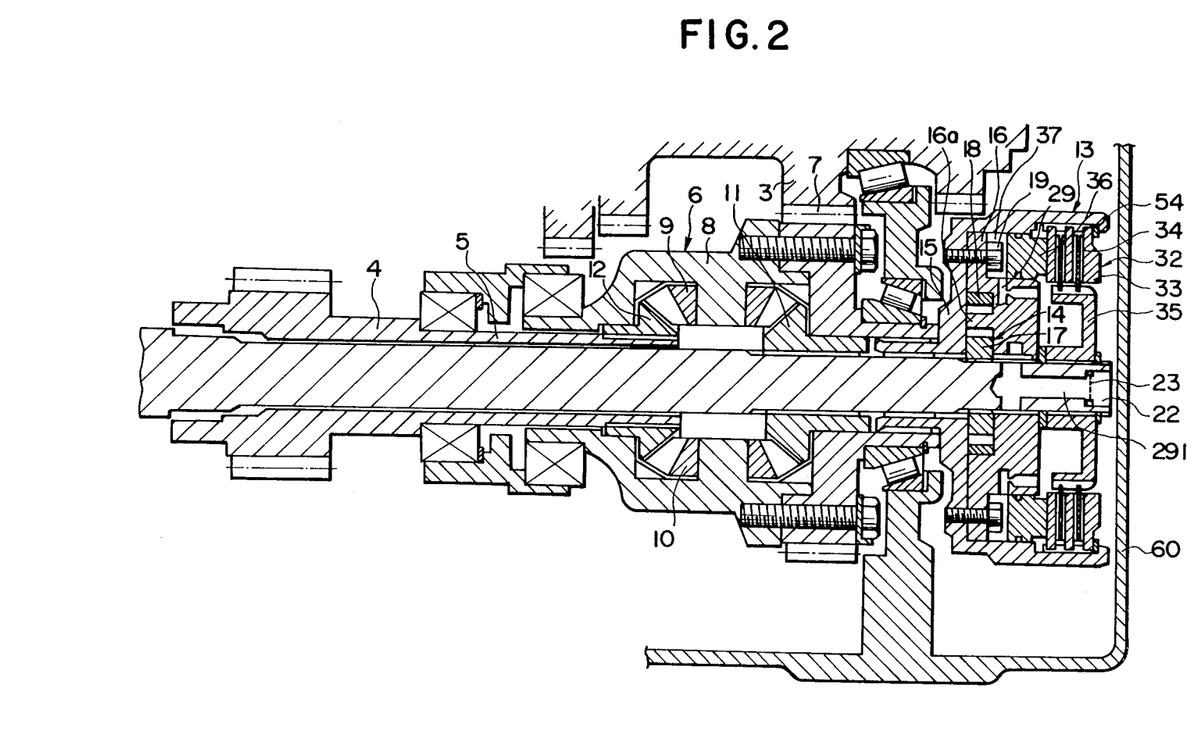
FIG. 2 is an explanatory sectional view of the essential portion of the first embodiment.

The first embodiment (FIGS. 1 to 4) includes a center differential mechanism capable of distributing the torque of an engine mounted on a four-wheel drive motor vehicle whose front and rear wheels are driven by the engine to the front and rear wheels. As shown in FIGS. 1 and 2, an engine 1 is disposed on a motor vehicle with the crankshaft thereof extending transversely of the motor vehicle. A transmission 2, namely, a power transmitting system, is connected to the engine 1. A drive gear 3 (or a fourth-speed gear) fixed to the output shaft 2' extending transversely of the motor vehicle of the transmission 2 engages with the ring gear 7 of a differential mechanism 6 (referred to as "center differential 6" hereinafter). An output shaft 4 (referred to as "rear output shaft 4" hereinafter) is connected to drive the rear wheels and an output shaft 5 (referred to as "front output shaft 5" hereinafter) is connected to drive the front wheels. Pinions 9 and 10 mounted on a differential case 8 formed integrally with the ring gear 7 engage with side gears 11 and 12. The side gears 11 and 12 are connected to the rear output shaft 4 and the front output shaft 5 respectively. A differential motion limiting mechanism 13 is interposed between the differential case or input shaft 8 and the rear output shaft 4 on the right side of the center differential 6, as viewed in FIG. 1. The rear output shaft 4 and the front output shaft 5 are arranged coaxially and extend leftward, as viewed in FIG. 1. A gear 38 fixed to the front output shaft 5 engages with the ring gear 39 of a differential mechanism 40 for driving the front wheels (referred to as "front differential 40" hereinafter). The torque of the front output shaft 5 is distributed by the front differential 40 to the right and left front axles 42 and 41 to drive the front wheels 44 and 43.

The rear output shaft 4 is connected through a bevel gear mechanism 45 to a propeller shaft 47 provided with a transfer 46. A bevel gear 47a fixed to the propeller shaft 47 engages with the ring gear 48 of a differential mechanism 49 for driving the rear wheels (referred to as "rear differential 49" hereinafter). Thus the torque of the rear output shaft 4 is distributed by the rear differential 49 to the right and left rear axles 51 and 50 to drive the rear wheels 53 and 52.

The differential motion limiting mechanism 13 is driven by the differential revolving or rotation speed between the differential case 8 and the rear output shaft 4. The differential motion limiting mechanism 13 comprises a oil pump 14 which discharges a variable fluid pressure proportional or corresponding to the differential revolving speed, and a clutch mechanism 32 (FIG. 2) which receives the oil discharged by the oil pump 14 through a hydraulic circuit 290 provided with a hydraulic controller 280 shown in FIG. 3 and regulates the degree of connection or coupling forces between the rear output shaft 4 and the differential case 8 to limit the differential revolving speed. The center differential 6 and the differential motion limiting mechanism 13 are disposed within the transmission case or housing 60 with the transmission 2.

The configuration and construction of the oil pump 14 and the clutch mechanism 32 will be described hereinafter.

Referring to FIG. 2, a case 15 is splined to the ring gear 7 secured to the differential case or input shaft 8 by bolts. The oil pump 14 is provided within the case 15. The gear type oil pump 14 has an external gear as an inner gear 17 splined to the rear output shaft 4 and an internal gear as an outer gear 18 engaging with the inner gear 17. The inner gear 17 and the outer gear 18 are eccentric with each other and are provided within a pump case 16. The pump case 16 is secured to the case 15 by bolts 19. An extension 16a of the pump case 16 extends into a gap between the inner gear 17 and the outer gear 18. The oil pump 14 has two ports 20 and 21 as shown in FIG. 3.

An annular boss is formed in the outer circumference of the pump case 16. An annular piston 36 is fitted on the annular boss of the pump case 16. An oil chamber 37 (clutch engaging oil chamber) is formed between the piston 36 and the pump case 16. A plurality of pressure plates 33 internally splined to the case 15 and a plurality of annular clutch plates 34 splined to the boss 35 of the rear output shaft 4 are arranged alternately and adjacently to the side of the piston 36 opposite the side of the same facing the oil chamber 37. The piston 36, the pressure plates 33 and the clutch plates 34 constitute the multiple disc clutch mechanism 32. An oil inlet hole 22 is formed in one end of the rear output shaft 4 and an oil filter element 23 is fitted in the oil inlet hole 22. Indicated by 54 is a stop member for retaining the pressure plates 33 in place.

The hydraulic circuit 290 and the hydraulic controller 280 will be described hereinafter.

Figure 3:
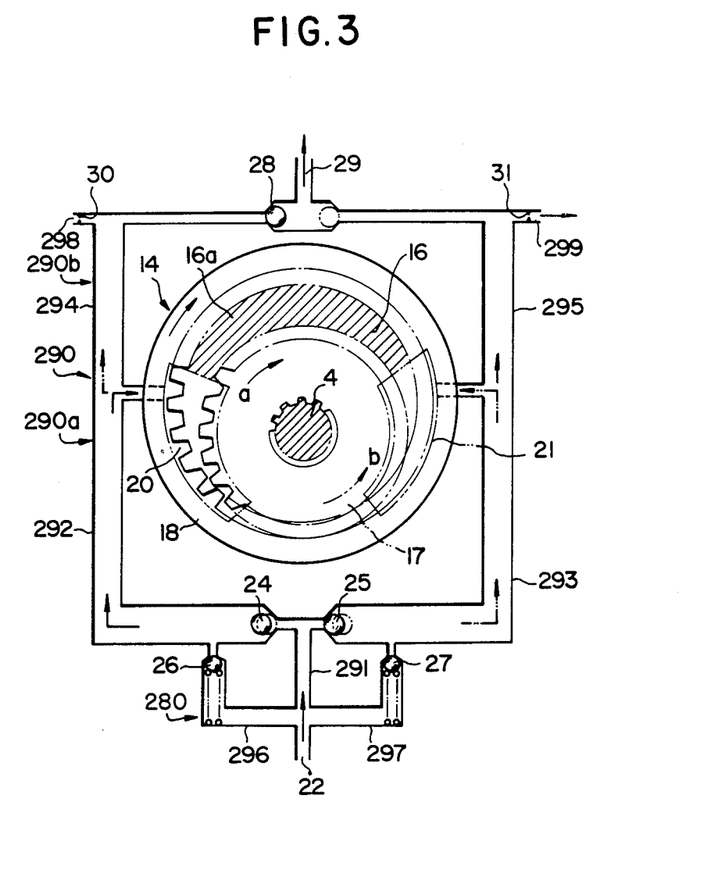
FIG. 3 is a diagrammatic illustration of the hydraulic circuit of the first embodiment.

As shown in FIG. 3, the first communication port 20 of the oil pump 14 is connected through a first line or passage 292, a first suction check valve 24 and a suction line 291 to the oil inlet hole 22 of the rear output shaft 4, and through a third line or passage 294 and a first and second discharge three-way check valve 28 to a discharge line 29. The second communication port 21 of the oil pump 14 is connected through a second line or passage 293, a second suction check valve 25 and the suction line 291 to the oil inlet hole 22, and through a fourth line or passage 295 and the three-way check valve 28 to the discharge line 29. A line 296 with a first relief valve 26 is interposed between the lines 291 and 292, while a line 297 with a second relief valve 26 is interposed between the lines 291 and 293. The respective relieving pressures of the relief valves 26 and 27 are set by springs 26' and 27' respectively. A line 298 with a first orifice 30 opening into the atmosphere is branched from the line 294, while a line 299 with a second orifice 31 opening into the atmosphere is branched from the line 295. The lines 298 and 299 are open toward the pressure plates 33 and the clutch plates 34 of the clutch mechanism 32 to discharge the oil against the pressure plates 33 and the clutch plates 34. The relief valve 26 and the orifice 30, or the relief valve 27 and the orifice 31 constitute the hydraulic controller 280. The lines 291, 292 and 293 constittue a first hydraulic circuit 290a for connecting the oil pump 14 to an oil sump formed in a transmission case 60. The lines 294, 295 and 29 constitute a second hydraulic circuit 290b for connecting the oil pump 14 to the clutch mechanism.

On the other hand, the lines 292 and 294 constitute first separate fluid passage means for supplying the fluid pressure from the first communicating port 20 to the clutch means 32 and the lines 293 and 294 constitute second separate fluid passage means for supplying the fluid pressure from the second communicating port 21 to the clutch means 32.

The manner of operation of the hydraulic circuit 290 and the hydraulic controller 280 will be described hereinafter.

While the motor vehicle is running straight, the differential revolving speed between the rear output shaft 4 and the front output shaft 5 is zero, provided that the tires of the front wheels 43 and 44 and the rear wheels 52 and 53 are the same in effective tire radius and the slip of the tires is small. Consequently, the oil pump 14 does not produce any hydraulic pressure, and hence the clutch mechanism 32 does not operate, the differential motion of the center differential 6 is not limited, and the driving torque of the engine is distributed uniformly or equally to the rear output shaft 4 and the front output shaft 5. Accordingly, the motor vehicle runs in the four-wheel drive mode with equal driving torques applied to the front wheels 43 and 44 and the rear wheels 52 and 53.

In case the revolving speed of the rear output shaft 4 exceeds that of the pump case 16 during the four-wheel drive mode due to the slip of the rear wheels 52 and 53, the inner gear 17 rotates in a direction indicated by an arrow a in FIG. 3. Consequently, the oil is pumped up from the port 20 through the first oil inlet hole 22, the line 291, the check valve 24 and the line 292 and is discharged through the second port 21, the line 295, the check valve 28 and the line 29 into the oil chamber 37 by the oil pump 14. Since the discharge pressure is proportional to the differential revolving speed between the rear output shaft 4 and the pump case 16, the pressure applied by the piston 36 to the pressure plates 33 and the clutch plates 34 increases with the differential revolving speed as represented by line A in FIG. 4. Consequently, the magnitude of the torque to be transmitted by the clutch mechanism 32 increases with the differential revolving speed.

Thus, when a differential revolving speed is produced, the clutch mechanism 32 couples the rear output shaft 4 and the pump case 16 at a coupling force corresponding to the differential revolving speed, and thereby the differential revolving speed is suppressed, and hence a torque is transmitted to the front output shaft 5. Accordingly, the front wheels 43 and 44 can be driven for rotation even when the rear wheels 52 and 53 are raced.

On the contrary, when the front wheels 32 and 44 slip, the inner gear 17 rotates automatically in a direction indicated by an arrow b. Then, the oil supply line is changed automatically so that the oil is sucked from the second port 21 through the oil inlet hole 22, the line 291, the check valve 25, the line 293, and the oil is discharged through the first port 20, the line 294, the check valve 28 and the line 29 into the oil chamber 37. The variation of this discharge pressure is represented by line B in FIG. 4. This discharge pressure is also proportional to the differential revolving speed between the rear output shaft 4 and the pump case 16, therefore, the magnitude of the pressure applied to the pressure plates 33 and the clutch plates 34 by the piston 36 is dependent on the differential revolving speed. Accordingly, the torque to be transmitted by the clutch mechanism 32 varies with the differential revolving speed. In this case also, the clutch mechanism 32 couples the rear output shaft 4 and the pump case 16 at a coupling force corresponding to the differential revolving speed, whereby the differential revolving speed is suppressed, and hence a torque is transmitted also to the rear output shaft 4. Thus the rear wheels 52 and 53 can be driven for rotation even if the front wheels 43 and 44 are raced.

When the differential revolving speed exceeds a certain value, the relief valve 26 or 27 opens to limit the discharge pressure within a safe range. The discharge pressure varies in proportion to the square of the differential revolving speed. The difference in form between curves A and B of FIG. 4 is attributable to the difference in performance between the orifices 30 and 31 and between the relief valves 26 and 27. the respective operating characteristics of the orifices 30 and 31 and the relief valves 26 and 27 are decided appropriately in consideration of the running characteristics of the motor vehicle.

Figure 4:
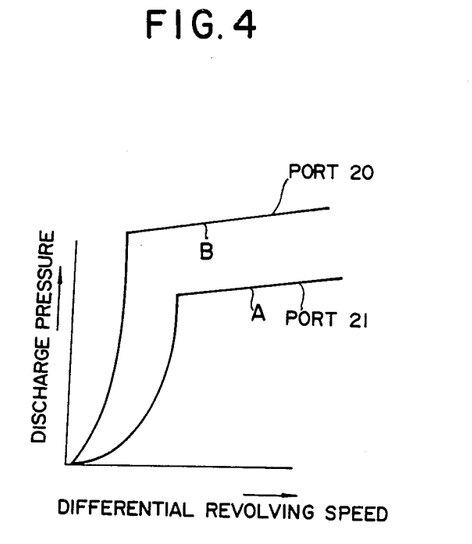
FIG. 4 is a graph showing the variation of the discharge pressure of the pump with differential revolving speed in the first embodiment.

Since the increasing rate of the discharge pressure of the oil pump 14 in terms of the differential revolving speed for the characteristic curve B of FIG. 4 is greater than that for the characteristic curve A of FIG. 4 because the first orifice 30 has a larger throttling capacity and the second orifice 31 has a smaller throttling capacity, and the relieving or limit pressure of the first relief valve 26 is higher than that of the second relief valve 27, the differential revolving speed between the front wheels 43 and 44 and the rear wheels 52 and 53 is suppressed more quickly when the front wheels 43 and 44 slip than when the rear wheels 52 and 53 slip, and hence the differential revolving speed suppressing action is effective to a higher degree of the differential revolving speed.

Thus, the differential revolving speed between the rear output shaft 4 and the front output shaft 5 is suppressed by the differential motion limiting mechanism 13 at a degree corresponding to the magnitude of the differential revolving speed. In case the rear wheels 52 and 53 slip during the ordinary four-wheel drive mode and the revolving speed of the rear output shaft 4 exceeds that of the pump case 16, the differential motion limiting mechanism 13 functions to suppress the differential revolving speed magnitude of the differential revolving speed. In such a case, the torque transmitted to the front output shaft 5 is increased to increase the revolving speed of the front wheels 43 and 44, while the torque transmitted to the rear output shaft 4 is decreased to decrease the revolving speed of the rear wheels 52 and 53, and thereby the slip of the rear wheels 52 and 53 is suppressed. On the contrary, in case the front wheels 43 and 44 slip, similarly, the torque transmitted to the rear output shaft 4 is increased to increase the revolving speed of the rear wheels 52 and 53, while the torque transmitted to the front output shaft 5 is decreased to decrease the revolving speed of the front wheels 43 and 44, and thereby the slip of the front wheels 43 and 44 is suppressed. Thus the racing of tme front wheels 43 and 44 or the rear wheels 52 and 53 due to slip during the four-wheel drive running of the motor vehicle is prevented.

Furthermore, the discharge pressure of the oil pump 14 is limited below a fixed value by the relief valves 26 and 27 to make the differential motion limiting mechanism 13 automatically inoperative and the differential revolving speed between the front wheels 43 and 44 and the rear wheels 52 and 53 is allowed by the agency of the center differential 6, and hence a braking phenomenon during the running of the motor vehicle along a curve is prevented automatically.

Still further, the increasing rate and the upper limit of the discharge pressure of the oil pump 14 shown in FIG. 4 can optimally be decided by appropriately deciding the size or throttling capacity of the orifices 30 and 31 and the pressure relieving or limit characteristics of the relief valves 26 and 27 of the hydraulic controller 280 so that the differential motion of the center differential 6 is controlled automatically according to the running condition of the motor vehicle, therefore, driving feeling and the stability of control of the motor vehicle are not deteriorated and the motor vehicle runs steadily.

Although the pressure plates 33 and the clutch plates 34 of the clutch mechanism 32 generate heat in during transmitting a torque for limiting the differential motion, part of the oil is discharged from the line 298 and 299 against the pressure plates 33 and the clutch plates 34 to cool and lubricate the pressure plates 33 and the clutch plates 34 of the clutch mechanism 32 satisfactorily.

Figure 5:
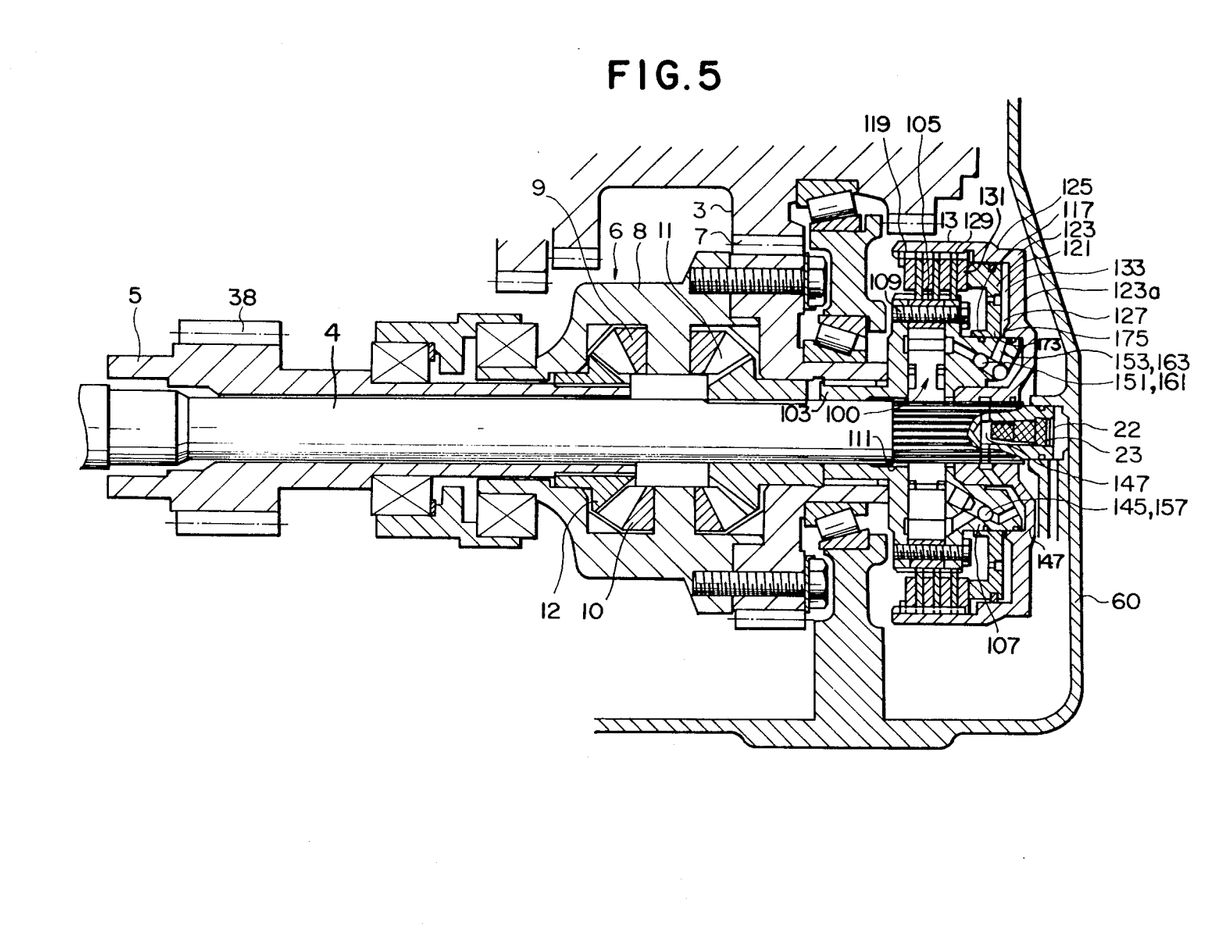
FIG. 5 is an explanatory sectional view showing the essential portion of a second embodiment of the present invention.
Figure 6:
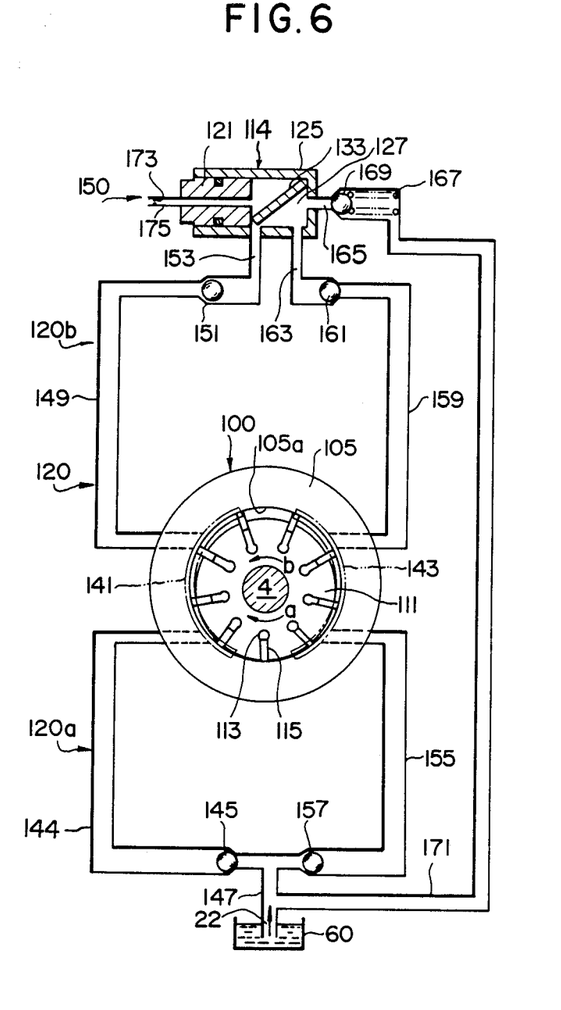
FIG. 6 is a diagrammatic illustration of the hydraulic circuit of the second embodiment.

A second embodiment of the present invention is shown in FIGS. 5 and 6. Parts like or corresponding to those of the first embodiment are designated by the same reference characters as those used for designating the parts of the first embodiment, and the description of those parts will be omitted.

Referring to FIGS. 5 and 6, indicated by 100 is a vane pump which is an oil pump. The principal part of a vane pump 100 comprises a pressure retainer 103, a cam ring 105 and a pump case 107, which those of are joined inteegrally with each other by bolts 109. The pressure retainer 103 is splined to a ring gear 7 fastened to a differential case 8 by bolts. The rotor 111 of the vane pump 100 is disposed in a space defined by the pressure retainer 103, the cam ring 105 and the pump case 107, and is splined to a rear output shaft 4. The rotor 111 and the cam ring 105 are eccentric with each other. A plurality of vane grooves 113 (nine vane grooves 113, in this embodiment) are formed in the circumference of the rotor 111 at equal circumferential intervals. Vanes 115 are fitted in the vane grooves 113 respectively in sliding contract with the inner circumference 105a of the cam ring 105.

As shown in FIG. 5, an annular boss 117 is formed on the outer circumference of the pump case 107. An annular piston 121, one of the components of a clutch mechanism 119, is fitted on the annular boss 117. The piston 121 and a cylinder 123 (the pump case 107 and a sleeve 125) define an oil chamber 127. The clutch mechanism 119 has a plurality (three, in this embodiment) of annular clutch plates 129 splined to the outer circumference of a clutch hub consisting of the pump case 107, the cam ring 105 and the pressure plate 103 and a plurality of pressure plate 131 splined to the inner circumference of the sleeve 125 employed as a the clutch cylinder 123 and connected to the rear output shaft 4. The clutch plates 129 and the pressure plates 131 are arranged alternately.

In the oil chamber 127, an annular spring 133 for biasing the piston 121 toward the pressure plate 131 is interposed between the inner surface 123a of the cylinder 123 and the piston 121 to apply an initial pressure to the pressure plates 131 so that an initial limiting torque is provided to the clutch mechanism.

A hydraulic circuit 120 employed in the second embodiment will be described hereinafter.

As shown in FIG. 6, two ports 141 and 143 are formed in the pump case 107. The port 141 is connected through a first line 144, a first suction check valve 145 and a suction line 147 to an oil inlet hole 22 formed in one end of the rear output shaft 4, and through a third line 149 and a first discharge check valve 151 to a discharge line 153. The other port 143 is connected through a second line 155, a second suction check valve 157 and the suction line 147 to the oil inlet hole 22, and through a fourth line 159 and a second discharge check valve 161 to a discharge line 163. The line 147 communicates with a line 165 communicating with the oil chamber 127 of the clutch mechanism 119 by means of a line 171 with a relief valve 169 set at a relieving pressure by the spring 167. The oil chamber 71 communicates with the atmosphere by means of an orifice 173 and a line 175 opening into the atmosphere. The line 175 is open toward the clutch plates 129 and the pressure plates 131 to discharge the oil against the clutch plates 129 and the pressure plates 131. The relief valve 169 and the orifice 173 formed through the piston 121 of the clutch mechanism 119 constitute a hydraulic controller 150.

The second embodiment thus constituted functions in the same manner as that of the first embodiment and provides the same effects as those of the first embodiment.

Furthermore, according to the construction of the second embodiment, since the vane pump 100 which is an oil pump and the clutch mechanism 119 are disposed coaxially with the rear output shaft 4, and disposed in radial alignment therewith and the vane pump 100 is disposed radially inside the clutch mechanism 119, the vane pump 100 and the clutch mechanism 119 are assembled in a compact construction with a reduced axial size.

Still further, since the piston 121 is urged continuously toward the pressure plates 131 by the annular spring 133 so that the clutch plates 129 makes close contact with the pressure plates 131 without any clearance, the cluch mechanism 119 engages operates immediately upon the start of the oil discharging operation of the vane pump 100 in response to the differential motion between the rear output shaft 4 and the front output shaft 5. Thus the clutch mechanism 119 is actuated immediately after a differential revolving speed is produced, and thereby the differential revolving speed is suppressed.

Figure 7:
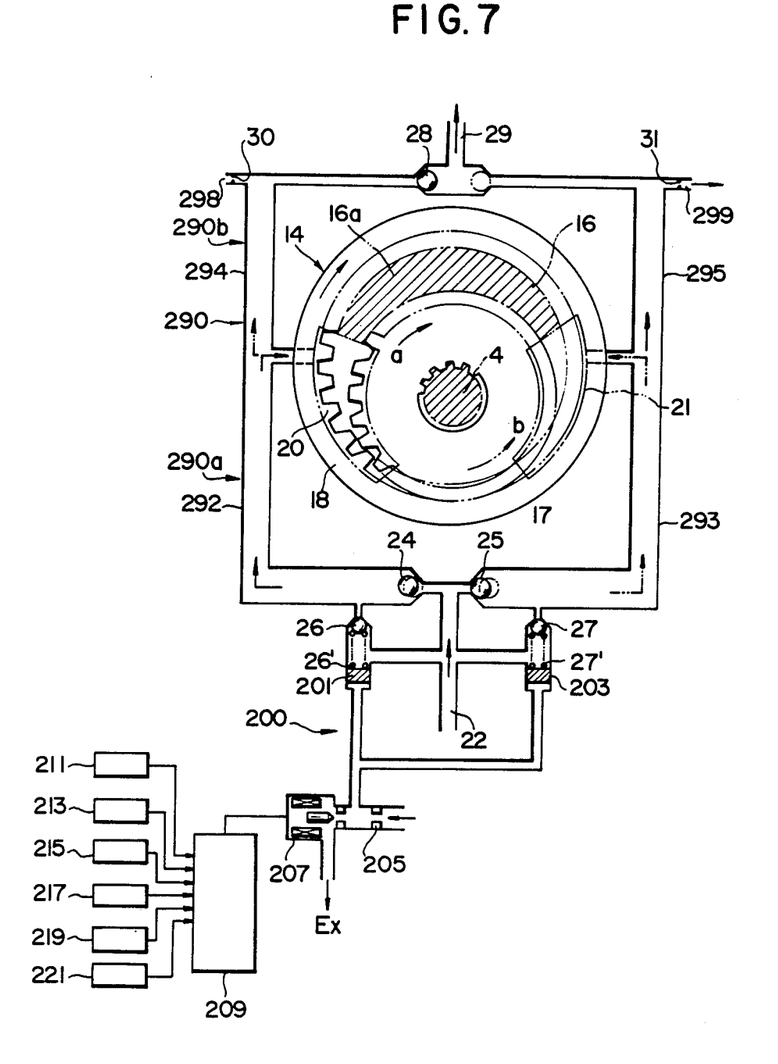
FIG. 7 is an explanatory illustration of a third embodiment of the present invention.

FIG. 7 shows a hydraulic circuit 290, oil pump 14, and a hydraulic controller 280 employed in a third embodiment of the present invention. The hydraulic circuit 290, oil pump 14 and the hydraulic controller 280 of the third embodiment are identical with those of the first embodiment, except that, in the hydraulic controller 280 of the third embodiment, the relief valves 26 and 27 of the first embodiment are substituted by a relief valve unit 200. The relief valve unit 200 has a relief valve 26 having a valve element, a piston 201 and a spring 26' interposed between the valve element and the piston 201, and a relief valve 27 having a valve element, a piston 203 and a spring 27' interposed between the valve element and the piston 203. Duty-controlled control pressure is applied to the pistons 201 and 203 to control the respective relieving or limit pressure of the relief valves 26 and 27. Supply of the oil of a fixed pressure of the relief valves 26 and 27 through an orifice 205 for duty control is controlled by a solenoid valve 207. The solenoid valve 207 regulates the pressure to be applied to the pistons 201 and 203 on the basis of signals given to a computer 209 by an engine speed sensor 211, a front output shaft speed sensor 213, a rear output shaft speed sensor 215, a throttle opening sensor 217, a braking action sensor 219 and a steering angle sensor 221. If the transmission 2 is automatic transmission, the control pressure of the automatic transmission may be used as the fixed pressure to be supplied through the orifice 205 for duty control. If the transmission 2 is a manual transmission, the discharge pressure of a separate oil pump, the pressure for power steering, the pressure for the brake booster or the discharge pressure of the oil pump 14 may be used as the fixed pressure to be supplied through the orifice 205 for duty control.

In accelerating the motor vehicle sharply or at the start of the same, the differential revolving speed between the front wheels 43 and 44 and the rear wheels 52 and 53 can be suppressed and hence the slipping rotation of the wheels can be prevented, and thereby the driving torque of the engine is distributed more efficiently to the front wheels 43 and 44 and the rear wheels 52 and 53 and the accelerating performance of the motor vehicle is improved by detecting the load of the engine 1 by the throttle opening sensor and increasing the discharge pressure of the oil pump 14 according to the existing load of the engine 1 on the basis of the detection signal given by the throttle opening sensor.

It is also possible to obviate the locking of the front wheels 43 and 44 and the rear wheels 52 and 53 when the brakes are applied, by increasing the discharge pressure of the oil pump 14 when the operation of the foot brake is detected by a brake operation detecting switch to suppress the differential revolving speed between the front wheels 43 and 44 and the rear wheels 52 and 53 so that the driving torque is distributed uniformly to the front wheels 43 and 44 and the rear wheels 42 and 53.

Thus, the braking performance is improved, the brake stopping distance of the motor vehicle is reduced and stable braking of the motor vehicle is achieved.

An undesirable braking phenomenon liable to occur while the motor vehicle is running along a curve can be avoided to enable the motor vehicle to run smoothly along a curve by decreasing the discharge pressure of the gear pump 14 on the basis of a detected steering angle as the steering angle increases so that the differential revolving speed between the front wheels 43 and 44 and the rear wheels 52 and 53 is allowed to increase with the increase of the steering angle.

Furthermore, stable running of the motor vehicle can be achieved by controlling the discharge pressure of the oil pump 14, according to the engine speed and/or the running condition of the motor vehicle on the basis of the detection signals given to the computer.

Figure 8:
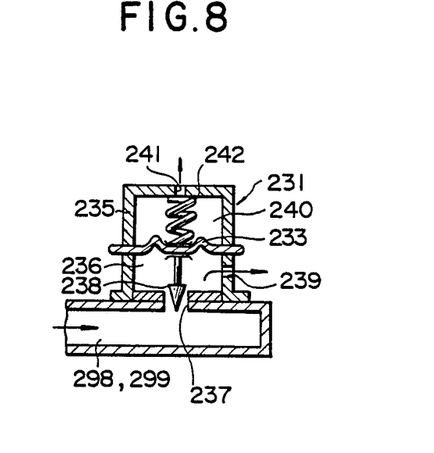
FIG. 8 is an explanatory illustration of a fourth embodiment of the present invention.

FIG. 8 shows an orifice unit 231 employed in the fourth embodiment of the present invention. The hydraulic circuit 290, the oil pump 14 and the hydraulic controller of the fourth embodiment are identical with those of the first embodiment respectively, except that the hydraulic controller of the fourth embodiment employs the orifice units 231 in the place of the orifices 30 and 31 of the hydraulic controller 280 of the first embodiment.

The orifice units 231 are disposed in lines 298 and 299 opening into the atmosphere. Since both the orifice units 231 are the same in construction and function, one of the orifice units 231 provided in the line 298 will be described.

The orifice unit 231 has a casing 235 partitioned into chambers 236 and 240 by a diaphragm 233. The chamber 236 communicates with the line 298, 299 opening into the atmosphere by means of a hole 237 and has a through hole 239 opening into the atmosphere. The hole 237 is opened or closed by a needle valve element 238 attached to the diaphragm 235. The other chamber 240 of the casing 233 communicates with the intake manifold of the engine 1 through a hole 241 through which the negative pressure of the intake manifold works on the chamber 240. A spring 242 is provided within the chamber 240.

Since the intake manifold pressure increases as the load on the engine increases, the passage area of the hole 237, namely, the orifice area corresponding to the throttling capacity decreases as the load on the engine increases. The hole 237 is never closed completely, but remains slightly open even under an extreme condition. Since the driving force increases when load on the engine increases, the passage area of the hole 237 is decreased when load on the engine increases to enable the discharge pressure of the oil pump 14 to rise rapidly in order to distribute the driving torque of the engine uniformly to the front wheels 43 and 44 and the rear wheels 52 and 53 by limiting the differential motion of the center differential 6. Thus, the driving torque of the engine is transmitted efficiently from the front wheels 43 and 44 and the rear wheels 52 and 53 to the ground, and hence the running performance of the motor vehicle is improved.

The intake manifold pressure decreases as load on the engine decreases, and thereby the passage area of the hole 237, namely, the orifice area, is increased. Consequently, the discharge pressure of the oil pump 14 increases gradually to allow a large relative rotation between the front output shaft 5 and the rear output shaft 4, namely, a large differential revolving speed between the front wheels 43 and 44 and the rear wheels 52 and 53, whereby the braking phenomenon liable to occur while the motor vehicle is running along a curve is avoided and the motor vehicle is allowed to run smoothly along a curve.

Figure 9:
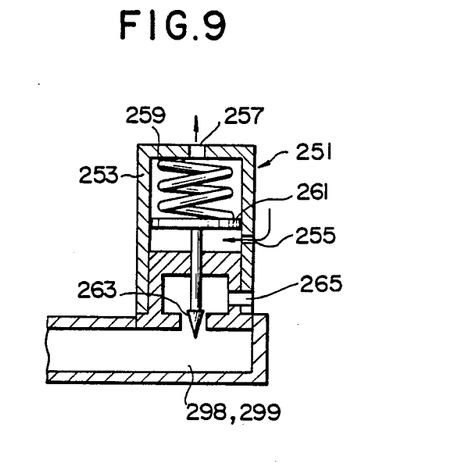
FIG. 9 is an explanatory illustration of a fifth embodiment of the present invention.

A fifth embodiment of the present invention will be described hereinafter. The hydraulic circuit 290, an oil pump 14, and the hydraulic controller of the fifth embodiment are identical with those described hereinbefore, except that the hydraulic controller of the fifth embodiment employs orifice units 251 as shown in FIG. 9 in the place of the orifices 30 and 31 of the above-mentioned hydraulic controller 280. Since the orifice units 251 provided in the line 298 and 299 are the same in construction and function, only one of the orifice units 251 provided in the line 298 will be described.

The orifice unit 251 has a casing 253 provided in the line 298, 299 openings into the atmosphere. The casing 253 is provided with a hole 255 through which the discharge pressure of the oil pump of the power steering system is supplied to the orifice unit 251, and a hole 257 through which the intake manifold pressure is supplied to the orifice unit 251. A piston 261 is fitted in the casing 253 between the holes 257 and 255. A spring 259 is provided within the casing 253 to bias the piston 261 toward the hole 255. The piston 261 is shifted upward or downward, as viewed in FIG. 9, by the differential pressure between the discharge pressure of the oil pump of the power steering system and the intake manifold pressure. A needle valve element 263 is attached to the lower end of the piston 261. The needle valve element 263 control the orifice area of a hole by means of which the line 298, 299 communicates with the atmosphere indicated at 265 in FIG. 9.

Since the use of the orofice unit 251 permits the oil pressure for power steering to increase as the steering angle increases, the needle valve element 263 is retracted as the steering angle increases to increase the orifice area of the hole by means of which the line 298, 299 communicates with the atmosphere. Consequently, the discharge pressure of the gear pump 14 increases gradually to allow a large differential revolving speed between the front output shaft 5 and the rear output shaft 4 so that the braking phenomenon liable to occur while the motor vehicle is running along a curve is avoided and the motor vehicle is allowed to run smoothly along a curve.

Furthermore, since the intake manifold pressure is supplied to the hole 257, and hence the opening of the line 298, 299 is also dependent on the torque of the engine, the differential motion of the center differential 6 can be limited according to the torque of the engine and the steering angle.

Since the oil pressure for power steering is far greater than the intake manifold pressure, the spring 259 must be a spring of a considerably high load rate.

The same objects as those described hereinbefore can be achieved by employing means to limit the distribution of the oil variably according to the operating condition of the motor vehicle, such as means to control the degree of opening of the line 298 or 299 into the atmosphere according to the oil pressure for braking operation or means to control the degree of opening of the line 298 or 299 into the atmosphere according to the mode of operation of the accelerator.

Furthermore, the degree of opening of the lines 298 and 299 can be controlled according to the running speed of the motor vehicle or the angular speed of steering operation.

In the above-mentioned embodiments of the present invention, each of the clutch mechanisms 32 and 119 is interposed between the ring gear 7 through which the driving torque of the engine 1 is transmitted to the center differential 6 and the rear output shaft 4, however, in a modification, it is possible to interpose the clutch mechanism between the ring gear 7 of the center differential 6 and the front output shaft or between the rear output shafts 4 and the front output shaft 5.

What is claimed is:

1. A differential with a differential movement limiting mechanism for a vehicle having an engine for producing a driving force, a transmission connected to the engine, front wheels and rear wheels, comprising:
   a differential mechanism including an input shaft and a pair of output shafts for recieving the driving force through the input shaft thereof from the transmission connected to the engine and for distributing the driving force to the pair of output shafts, one of the pair of output shafts comprising a front-wheel output shaft for driving the front wheels and the other comprising a rear-wheel output shaft for driving the rear wheels;
   an oil pump interposed between two of the three input and output shafts and being driven by said two shafts so as to produce a discharge pressure having a certain characteristic proportional to a differential revolving speed between said two shafts;
   a clutch mechanism interposed between said two of the three shafts for coupling the two shafts in response to the discharge pressure applied thereto from said oil pump so as to reduce the revolving speed difference between said two shafts;
   a hydraulic circuit for sucking hydraulic fluid into said oil pump and supplying the discharge pressure from said oil pump to said clutch mechanism;
   and hydraulic control means arranged in said hydraulic circuit for modulating the characteristic of the discharge pressure supplied from said oil pump to said clutch mechanism according to the rotational direction of said front-wheel output shaft relative to said rear-wheel output shaft.

2. A differential according to claim 1; wherein said hydraulic control means includes an orifice device for automatically controlling an increasing rate of the discharge pressure supplied from said oil pump to said clutch mechanism.

3. A differential according to claim 1; wherein said hydraulic control means includes a relief valve device for automatically controlling an opening pressure thereof so as to limit the discharge pressure supplied from said oil pump to said clutch mechanism.

4. A differential according to claim 1; wherein
   said hydraulic circuit has an oil sump for storing the hydraulic fluid, and two oil passages each of which has two check valves for admitting exclusively the flow of the hydraulic fluid from said oil sump into said clutch mechanism,
   said oil pump has two ports, one of which is connected to one of said two ol passages at a location therealong between said two check valves thereof, and the other of which is connected to the other of said two oil passages at a location therealong between said two check valves thereof, and
   said hydraulic control means has two relief valves disposed along respective ones of the two oil passages between said two check valves thereof and operative to discharge the hydraulic fluid from the oil passage when the oil pressure in the oil passage exceeds a fixed value, and two orifices which are provided with discharge openings being arranged effectively parallel to each of said relief valves and operative to control the amount of the hydraulic fluid discharged from the discharge openings.

5. A differential according to claim 4; wherein the opening pressures of said two relief valves are set at different values, the relief valve having the lower valve being operated when said front-wheel output shaft rotates slower than said rear-wheel output shaft.

6. A differential according to claim 4; wherein the throttling degrees of said two orifices are set at different values, the orifice having the lower value being operated when said front-wheel output shaft rotates slower than said rear-wheel output shaft.

7. A differential according to claim 4; wherein the opening pressures of said two relief valves are set at different values and also the throttling degrees of said two orifices are set at different values, the relief valve having the lower value and the orifice having the lower value being operated when said front-wheel output shaft rotates slower than said rear-wheel output shaft.

8. A power transmission system for a four-wheel drive vehicle having an engine and a transmission connected to the engine, comprising: a differential mechanism including an input shaft and a pair of output shafts for receiving a drive torque produced by the engine through the input shaft from the transmission and for differentially distributing the drive torque to the pair of output shafts; pump means cooperatively driven by two of the three input and output shafts for producing a variable fluid pressure proportional to the rotational speed difference between said two of the three shafts; clutch means connected to the pump means and disposed between said two of the three shafts for frictionally coupling said two shafts with each other by a variable coupling force corresponding to the magnitude of the fluid pressure applied thereto so as to reduce the rotational speed difference between said two shafts; a hydraulic circuit for supplying hydraulic fluid to the pump means and for transmitting the fluid pressure produced by the pump means to the clutch means; and fluid pressure control means disposed in the hydraulic circuit for modulating the fluid pressure of the hydraulic fluid flowing through the hydraulic circuit according to the rotational direction of one output shaft relative to the other output shaft so that the clutch means produces different coupling forces in response to whether one output shaft rotates faster or slower than the other output shaft.

9. A power transmission system according to claim 8; wherein the pair of output shafts comprises a front output shaft and a rear output shaft.

10. A power transmission system according to claim 9; wherein the pump means is connected to be cooperatively driven by the input shaft and the rear output shaft of the differential mechanism, and the clutch means is disposed between the input shaft and the rear output shaft of the differential mechanism.

11. A power transmission system according to claim 10; wherein the input shaft has a hollow cylindrical shape and is coaxially disposed around the rear output shaft.

12. A power transmission system according to claim 11; including a housing disposed at the end portions of the input and rear output shafts for mounting the clutch means and the pump means.

13. A power transmission system according to claim 12; wherein the pump means is disposed between the input shaft and the rear output shaft.

14. A power transmission system according to claim 13; wherein the clutch means is coaxially disposed around the outer peripheral portion of the pump means.

15. A power transmission system according to claim 9; wherein the pump means has first and second communicating ports, the first communicating port providing the fluid pressure when the front output shaft rotates faster than the rear output shaft, and the second communicating port providing the fluid pressure when the front output shaft rotates slower than the rear output shaft.

16. A powwoer transmission system according to claim 15; wherein the hydraulic circuit includes first and second separate fluid passage means, the first fluid passage means supplying the fluid pressure from the first communicating port to the clutch means, and the second fluid passage means supplying the fluid pressure from the second communicating port to the clutch means.

17. A power transmission system according to claim 16; wherein the fluid pressure control means includes a first relief valve having a relatively large limit pressure value and disposed in the first fluid passage for providing a wide range of fluid pressures when the front output shaft rotates faster than the rear output shaft, and a second relief valve having a relatively small limit pressure value and disposed in the second passage for providing a small range of fluid pressures when the front output shaft rotates slower than the rear output shaft.

18. A power transmission system according to claim 16 or 17; wherein the fluid pressure control means includes a first orifice means having a relatively large throttling capacity and disposed in the first fluid passage for providing fluid pressure having a large rising rate in terms of the rotational speed difference between the front and rear output shafts when the front output shaft rotates faster than the rear output shaft, and a second orifice means having a relatively small throttling capacity and disposed in the second orifice means for providing fluid pressure having a small rising rate in terms of the rotational speed difference between the front and rear output shafts when the front output shaft rotates slower than the rear output shaft, whereby the clutch means is controlled to relatively strongly couple the front and rear output shafts when the front output shaft rotates faster than the rear output shaft and to relatively weakly couple the front and rear output shafts when the front output shaft rotates slower than the rear output shaft.

19. A power transmission system according to claim 16; wherein the hydraulic circuit includes a fluid sump for supplying the fluid to the pump means.

20. A power transmission system according to claim 19; wherein the first fluid passage means comprises a first passage connected between the fluid sump and the first communicating port, a third passage connected between the clutch means and the first communicating port, a first suction check valve disposed in the first passage, and a first discharge check valve disposed in the third passage, and the second fluid passage means comprises a second passage connected between the fluid sump and the second communicating port, a fourth passage connected between the clutch means and the second communicating port, a second suction check valve disposed in the second passage, and a second discharge check valve disposed in the fourth passage.

21. A power transmission system according to claim 8; wherein the clutch means comprises a multiple disc clutch.

22. A power transmission system according to claim 8; wherein the pump means comprises a gear type pump.

23. A power transmission system according to claim 8; wherein the pump means comprises a vane pump.

24. A power transmission system according to claim 8; wherein the fluid pressure control means includes relief means disposed in the hydraulic circuit for limiting the fluid pressure flowing through the hydraulic circuit in response to whether or not one output shaft rotates faster than the other output shaft.

25. A power transmission system according to claim 8; wherein the fluid pressure control means includes orifice means disposed in the hydraulic circuit for controlling the rising rate of the fluid pressure flowing through the hydraulic circuit in response to whether or not one output shaft rotates faster than the other output shaft.

26. A power transmission system according to claim 25; wherein the fluid pressure control means further includes means for controlling the throttling action of the orifice means in response to a manifold negative pressure of the engine.

27. A power transmission system according to claim 25; wherein the fluid pressure control means further includes means for controlling the throttling action of the orifice means in response to a discharge pressure from a power steering oil pump of the vehicle.

* * * * *